DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 7

T940,007
CONVERSION OF WASTE RUBBER TO FUEL AND OTHER USEFUL PRODUCTS

John W. Larsen, Rte. 3, Joe Lewis Road, Knoxville, Tenn. 37920

Filed May 17, 1974, Ser. No. 470,862
Int. Cl. C10l *5/48*
U.S. Cl. 44—1 D
No Drawing. 14 Pages Specification

Heretofore waste rubber, a substantial amount of it in the form of used automobile tires, has been buried, burned, or otherwise disposed of in manners and by means totally inconsistent with good ecological practices and considerations. Now, such waste or scrap rubber, both natural and synthetic, can readily be converted in the presence of molten acidic halide Lewis salt catalysts to useful products, including fuels comprising a naphttha-like oil, a burnable solid carbonaceous material, and a mixture of gases. The most promising salts are zinc chloride, tin chloride, and antimony iodide. Also, an extremely active catalyst can be prepared by adding up to about 60 percent by weight of sodium chloride to the zinc chloride catalyst. The burnable carbonaceous material has been shown to be a carbon black of moderate quality and is believed to be suitable for reuse in tires if blended with high-quality fresh carbon black.